(12) United States Patent
Boldyrev et al.

(10) Patent No.: US 8,996,693 B2
(45) Date of Patent: Mar. 31, 2015

(54) METHOD AND APPARATUS FOR PROVIDING DYNAMIC STREAM PROCESSING OF DATA BASED ON STATIC ANALYTICS

(71) Applicant: Nokia Corporation, Espoo (FI)

(72) Inventors: Sergey Boldyrev, Söderkulla (FI); Lauri Aarno Olavi Tarkkala, Berlin (DE)

(73) Assignee: Nokia Corporation, Espoo (FI)

( * ) Notice: Subject to any disclaimer, the term of this patent is extended or adjusted under 35 U.S.C. 154(b) by 199 days.

(21) Appl. No.: 13/621,511

(22) Filed: Sep. 17, 2012

(65) Prior Publication Data

US 2014/0082178 A1    Mar. 20, 2014

(51) Int. Cl.
| | | |
|---|---|---|
| *G06F 15/173* | (2006.01) | |
| *H04L 29/08* | (2006.01) | |
| *H04W 4/00* | (2009.01) | |
| *H04W 4/02* | (2009.01) | |

(52) U.S. Cl.
CPC .............. *H04L 67/10* (2013.01); *H04L 29/08* (2013.01); *H04W 4/008* (2013.01); *H04W 4/02* (2013.01)
USPC .......................................... 709/224; 709/223

(58) Field of Classification Search
CPC ................................. H04L 29/08; H04L 67/10
USPC ..................................................... 709/223, 224
See application file for complete search history.

(56) References Cited

U.S. PATENT DOCUMENTS

| | | | | |
|---|---|---|---|---|
| 5,999,534 | A * | 12/1999 | Kim ......................... | 370/395.42 |
| 6,035,278 | A * | 3/2000 | Mansour ..................... | 705/7.19 |
| 7,693,808 | B2 * | 4/2010 | Tingling ........................ | 706/45 |
| 2006/0019665 | A1 * | 1/2006 | Aghvami et al. ............. | 455/444 |
| 2007/0282775 | A1 * | 12/2007 | Tingling ........................ | 706/45 |
| 2013/0073400 | A1 * | 3/2013 | Heath ........................ | 705/14.73 |
| 2013/0073473 | A1 * | 3/2013 | Heath ............................ | 705/319 |
| 2014/0059185 | A1 * | 2/2014 | Siripurapu et al. ........... | 709/219 |

\* cited by examiner

*Primary Examiner* — Mohamed Wasel
(74) *Attorney, Agent, or Firm* — Alston & Bird LLP

(57) ABSTRACT

An approach is provided for integrating various data processing methods for more accurate and comprehensive results. A data processing mechanism determines at least one processing element of at least one dynamic processing mechanism. Further, the data processing mechanism causes a marshalling of the at least one processing element as at least one data object, wherein the at least one data object is processable by at least one static processing mechanism.

20 Claims, 11 Drawing Sheets

METHOD AND APPARATUS FOR PROVIDING DYNAMIC STREAM PROCESSING OF DATA BASED ON STATIC ANALYTICS

BACKGROUND

Service providers and device manufacturers (e.g., wireless, cellular, etc.) are continually challenged to deliver value and convenience to consumers by, for example, providing compelling network services. One area of interest has been development of applications and services, which process and/or utilize various types of data in order to provide accurate, appropriate, and updated information. In particular, these applications and services can include processing and analyzing data utilized, for example, by social networking services, navigation services, search engines, content providers, and the like. Traditionally, data processing and analysis may be implemented via one or more servers (or nodes) and/or clusters of servers (or nodes) that provide, for instance, distributed computing and/or data storage to support the services. Moreover, such data processing and analysis historically have been segregated based on whether the data being processed is "slow moving" data (e.g., static or relatively static data that is collected over long periods of time such as user behavior data, service usage information, etc. processed by analytics systems) or whether the data is collected as data streams in real-time (e.g., social networking feeds, location tracking feeds, etc. processed by stream processing systems). Each different type of data (e.g., slow moving vs. real-time) has had different data processing architectures and techniques that traditionally have been used in isolation. As a result, service providers and device manufacturers face significant technical challenges to managing and/or integrating the data processing and analysis methods for slow moving data with the data processing and analysis methods for real-time data.

SOME EXAMPLE EMBODIMENTS

Therefore, there is a need for data processing methods to generate comprehensive results that combines the features of a slow moving data systems with real-time data systems.

According to one embodiment, a method comprises determining at least one processing element of at least one dynamic processing mechanism. The method also comprises causing, at least in part, a marshalling of the at least one processing element as at least one data object, wherein the at least one data object is processable by at least one static processing mechanism.

According to another embodiment, an apparatus comprises at least one processor, and at least one memory including computer program code for one or more computer programs, the at least one memory and the computer program code configured to, with the at least one processor, cause, at least in part, the apparatus to determine at least one processing element of at least one dynamic processing mechanism. The apparatus is further caused to cause, at least in part, a marshalling of the at least one processing element as at least one data object, wherein the at least one data object is processable by at least one static processing mechanism.

According to another embodiment, a computer-readable storage medium carrying one or more sequences of one or more instructions which, when executed by one or more processors, cause, at least in part, an apparatus to determine at least one processing element of at least one dynamic processing mechanism. The apparatus is further caused to cause, at least in part, a marshalling of the at least one processing element as at least one data object, wherein the at least one data object is processable by at least one static processing mechanism.

According to another embodiment, an apparatus comprises means for determining at least one processing element of at least one dynamic processing mechanism. The apparatus further comprises means for causing, at least in part, a marshalling of the at least one processing element as at least one data object, wherein the at least one data object is processable by at least one static processing mechanism.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side (e.g., via the computer system of FIG. 9) or on the mobile device side (e.g., via the mobile device of FIG. 11) or in any shared way between service provider and mobile device with actions being performed on both sides.

For various example embodiments, the following is applicable: An apparatus comprising means for performing any of the methods (or processes) disclosed in this application as relevant to any embodiment of the invention.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention.

Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for smart data processing methods for more accurate and comprehensive results. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
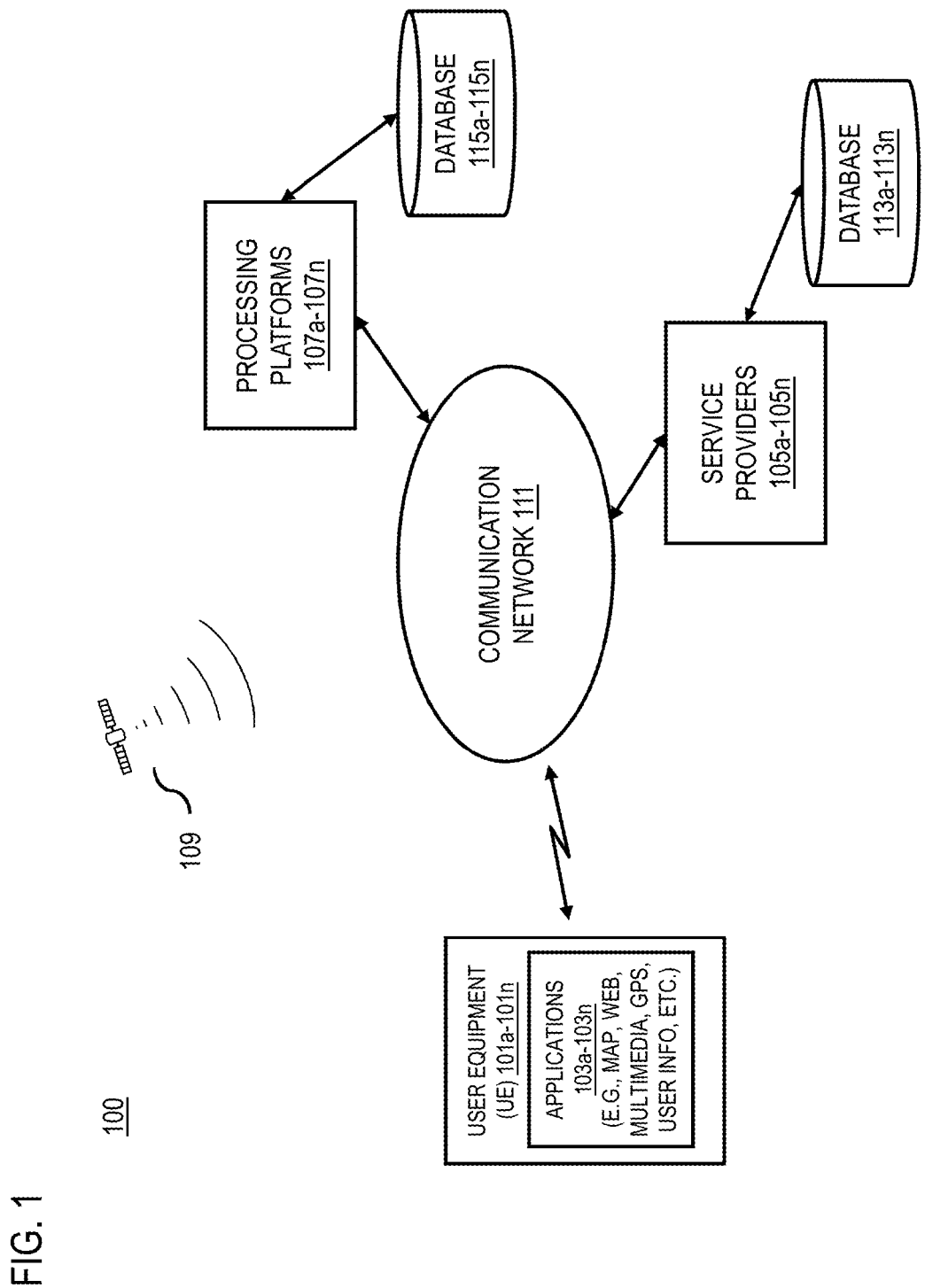
FIG. 1 is a diagram of a system capable of providing a framework for smart data processing platform, according to one embodiment.

FIG. 1 is a diagram of a system capable of providing services via a backend capable of data processing methods for more accurate and comprehensive results, according to an embodiment. With an ever increasing amount of data; for example, from users (e.g., user profile), sensor data (e.g., accelerometer, gyroscope, geomagnetic, orientation, atmospheric pressure, humidity, temperature, etc.), service providers (e.g., social networking services, content providers, search engines, data mining, etc.), there is a need to properly process the data in order to harness most accurate and valuable information from available data. Traditional data processing approaches include utilization of static and/or dynamic methods to analyze the data via various network resources (e.g., computer systems, servers, distributed computing, etc.) In the static processing method, as the database sizes may reach multiple gigabytes and terabytes, the data is processed according to one or more predetermined schedules (e.g., daily/weekly batch jobs), wherein the data may be considered to be slow-moving data and available from various sources (e.g., data stores.) In the other hand, in the dynamic processing (e.g., stream processing), the data may be processed near real-time, wherein the data may be considered to be fast-moving (e.g., near real-time) and from various sources, for example, data feeds, users, service providers (e.g., Twitter®), search engines, content providers, etc. However, since the two processing methods treat the data as either static data or as data stream, in separate flows, the resulting analytics of either method do not include impact/advantages of both the static data (e.g., historical data) and the dynamic data (e.g., newer data), wherein additional value may be captured if there were feedback mechanisms between the two processes and analysis. For example, a service provider may be able to provide a more accurate recommendation service for a particular movie (e.g., based on ratings of a particular movie and a user profile) if historical data (e.g., over the last two weeks) as well as current data associated with the movie (e.g., from other current users) are considered in an analysis for the recommendation service. Therefore, service providers face significant challenges to efficiently process historical and current data for determining valuable information in any given data sets.

To address, at least, these problems, a system 100 of FIG. 1 introduces the capability for utilization of static and dynamic data analytics in various data processing mechanisms (e.g., distributed and/or local analytics engines). More specifically, the system 100 uses the static data of analytics engines with encapsulated computational chains (e.g., by marshalling the encapsulated computations as data objects that are associated with and travel with the static data content). In one embodiment, the encapsulated computational chains form the processing elements (PEs) of stream processing mechanisms. Because, the encapsulated computational chains are marshalled as data, these chains can be shaped by the analytics engines and then returned to the stream processing systems as PEs for processing real-time data, where marshalling may be considered as a process for transforming memory representation of an object to a data format (e.g., similar to serialization) suitable for storage and/or transmission of the data to different components of a process and/or from one process to another process. In some embodiments, the real-time processing systems may detect changes or trends in real-time data streams and feed this information back to the analytics engines which can then update the marshalled computational chains of the PEs of the stream processing systems. Therefore, the system 100 provides a complete lifecycle of slow moving data analytics and fast moving data analytics.

In general, users and service providers require various data features from various data processing and analysis mechanism, which are capable of granular and scalable data features extraction, attribute selection, dataset fusion and lifting, and the like. For initial stages of data processing, one or more processes may need to detect and validate valuable features in a data set. Further, features may be detected and extracted with entropy minimization approach when a stable state may indicate that a phase shift occurred (e.g. binary data has been tagged; meta-data is created in order to represent binary, etc.) Furthermore, granular and scalable data features extraction may be achieved by defining assumptions as to what is the abstraction level of data—e.g., digital signals from sensors, types of data models implied onto a sensory input, binary data as second level above the signal data, structured and semi-structured data as third level, and knowledge at fourth level. Additionally, attributes may be selected by determining importance weights based and domain specific rules. Moreover, dataset fusions and lifting may be accomplished by abstraction levels normalization, levels fusion and lifting (e.g., step functions).

In various embodiments of the system 100, the data processing mechanisms (e.g., engines, pipelines, etc.) may include a dynamic stream processing (e.g., real-time or a near real-time) and a static processing (e.g., map-reduce batch jobs) where the dynamic stream process may operate on one or more data feeds from various sources (e.g., users, service providers, sensors, etc.) and the static process may operate on data from one or more databases (e.g., historical data). The data feeds are sequences of objects mapped to contextual information (e.g., geotag, motion, movement, time, etc.), where the information may change over time, and the historical data may include large volumes of contextual data collected from various sources over time (e.g., hours, days, weeks, etc.) In various embodiments, one or more service providers may utilize analytics from both processing mechanisms to further process and/or utilize in providing various services to users and/or to other service providers. In one embodiment, a PE interface may analyze historical data in the static process and update (e.g., correlate) dataset and structure utilized in the dynamic stream process for a more comprehensive result. For example, analytics based on a static process may determine and/or indicate one or more trends (e.g., location based, event based, etc.) in a data feed, wherein the data feed alone may not depict a complete status of the one or more trends. In one embodiment, dynamic processing mechanism may process realtime data as well as historical data (e.g., input as a stream replay). In one instance, one or more data sets may be processed by the ETL according to various scripts which are shaping the map-reduce mechanism.

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) client applications, including games, social networking, web browser, media application, user interface (UI), map application, web client, etc. to communicate with other UEs 101, one or more service providers 105a-105n (also collectively referred to as service providers 105), one or more processing platforms 107a-107n (also collectively referred to as processing platform 107), one or more GPS satellites 109, and/or with other components of the system 100 directly and/or via communication network 111. In one embodiment, the processing platform 107 is a computer system (e.g., a server) as described with respect to the FIG. 9 below.

In one embodiment, the service providers 105 may include and/or have access to one or more database 113a-113n (also collectively referred to as database 113), which may include various user information, content items, user profiles, user preferences, one or more profiles of one or more user devices (e.g., device configuration, sensors information, etc.), service provider information, other service provider information, and the like. In one embodiment, the service providers 105 may include one or more service providers offering one or more services, for example, messaging (e.g., instant messaging (IM), online chatting, etc.), online shopping, social networking services (e.g., blogging), media upload, media download, media streaming, account management services, or a combination thereof. Further, the service providers 105 may conduct a search for content, media, information, and the like associated with one or more users and/or one or more products.

In one embodiment, the processing platform 107 may include and/or have access to one or more database 115a-115n (also collectively referred to as database 115), which may store, include, and/or have access to various data, for example, from different sources and/or different time periods associated with location information, user information, device information, points of interest (POIs), service provider information, and the like. Further, the processing platform 107 may include various processing platforms utilizing various processing mechanisms, for example, direct processing, distributed processing (e.g., server farms), static processing, dynamic processing, and the like. Furthermore, the processing platform 107 and/or the database 115 may be partially or completely implemented within one or more service providers, one or more modules, one or more architectures, and the like. In one embodiment, the processing platform 107 is a computer system as described with respect to the FIG. 9 below.

In various embodiments, the processing platform 107 may sort, manage, store, and/or make the data available based on various parameters, for example, location information (e.g., of a user, of a service provider, of a requestor, etc.), sequential order, data type, date/time of data creation and/or submission, date/time of a data request, and the like. In certain embodiments, the collaboration module 115 implemented as a collection of one or more hardware, software, algorithms, firmware, or combinations thereof that can be integrated for use with the service providers 105 and/or with the processing platform 107. In various embodiments, the processing platform 107 may be maintained on a network server, while operating in connection with the service providers 105 as an extensible feature, a web-service, an applet, a script, an object-oriented application, or the like to enable searching for and/or processing of the social networking information. Further, the processing platform 107 and/or the service providers 105 may utilize one or more service application programming interfaces (APIs)/integrated interface, through which communication, data, and the like may be exchanged, shared, accessed, and/or processed.

In one embodiment, the UE 101 includes a location module/sensor that can determine the UE 101 location (e.g., a user's location). The UE 101 location can be determined by a triangulation system such as a GPS, assisted GPS (A-GPS), Cell of Origin, wireless local area network triangulation, or other location extrapolation technologies. Standard GPS and A-GPS systems can use the one or more satellites 109 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., WLAN) connection to determine the UE 101 location information, for example, from an Internet source (e.g., a service provider).

In one embodiment, the system 100 determines at least one PE of at least one dynamic processing mechanism (e.g., engine). In one embodiment, a processing platform 107 may include a dynamic process (e.g., stream process), which may operate on real-time or near real-time data stream to determine and/or process one or more PEs. For example, a PE may include computational code and/or data, which may be associated with one or more information items from a user and/or a service provider (e.g., a Twitter® feed, location based information, etc.), wherein the PEs may indicate a most common topic, location, hash-tag, and the like. In another example, a PE may include data as well as executing code where one or more functions of a process may be defined (e.g., process a counter, determine occurrence of certain data patterns or popularity of a certain topic, traffic analysis, route planning, reverse geocoding (RGC), etc.) In one embodiment, the processing platform 107 may include a static process, which may determine and/or process the one or more PEs. For example, the static process may preform one or more processes associated the one or more PEs, one or more dynamic processes, one or more distributed processes, or a combination thereof. In one embodiment, one or more other elements (e.g., servers, processors, etc.) of the system 100 may determine and/or process the one or more PEs instead of and/or in conjunction with the, processing platform, the dynamic process, and/or the static process.

In one embodiment, the system 100 causes, at least in part, a marshalling of the at least one PE as at least one data object, wherein the at least one data object is processable by at least one static processing mechanism. In one embodiment, marshalling is a process of encoding an object for sharing, sending, and/or communicating the object to one or more component, processes, and the like of a computer and/or a network (e.g., from a client to a server). In one embodiment, the at least one static processing mechanism operates, at least in part, in a batch mode with a predetermined batch frequency; and wherein the at least one dynamic processing mechanism, the at least one PE, or a combination thereof operate, at least in part, in substantially real-time or at a frequency greater that the predetermined batch frequency. In one embodiment, the at least one static processing mechanism is associated with performing, at least in part, slow moving data analytics; and wherein the at least one dynamic processing mechanism, the at least one PE, or a combination thereof are associated with performing, at least in part, fast moving data analytics.

In one embodiment, the PE may include an executable code (e.g., binary code), which may be executing in the stream process, wherein the data object may include information on the current process state, execution steps (e.g., snap shot of the state of the process), values of variables, and the like where the data object may continue to be processed at a different time and/or in a different process (e.g., static process).

In one embodiment, the system 100 processes and/or facilitates a processing of at least substantially real-time data via the at least one PE to determine one or more triggering events. In one embodiment, the dynamic processor evaluates, processes, analyzes real-time and/or near real-time data (e.g., from users) to determine one or more triggering events, wherein the triggering events may be predetermined and/or determined based on one or more criteria. For example, the triggering event may be based on a location, an event type, a user profile, a service provider, and the like. In one embodiment, the one or more triggering events include, at least in part, one or more contextual trends occurring above at least one threshold level. For example, a threshold value may include a number of users, a particular geographical location, a certain communication topic, and the like.

In one embodiment, the system 100 causes, at least in part, a transfer of the at least one data object to the at least one static processing mechanism based, at least in part, on the one or more triggering events. In one embodiment, one or more triggering events (e.g., an event at a certain geographical location) may cause a PE interface to transfer one or more data objects to one or more static processing mechanisms (e.g., batch jobs) for utilization in one or more processes, wherein the processing may be based, at least in part, on the information encapsulated in the data object and historical data available to the static processor.

In one embodiment, the system 100 causes, at least in part, an unmarshalling of the at least one processing element as at least one data object, wherein the at least one data object is processable by the at least one static processing mechanism. In one embodiment, and unmarshalling process is to decode the object that was marshalled. For example, in a distributed computing environment, an object is marshalled (e.g., encoded, serialized) for sending the object from a client to a server side or from one process to another, and an unmarshalling is a process to decode (e.g., de-serialize) the encoded object at the receiving side.

In one embodiment, the system 100 processes and/or facilitates a processing of the at least one data object via the at least one static processing mechanism to cause, at least in part, an updating of the at least one data object based, at least in part, on the one or more triggering events, the one or more contextual trends, or a combination thereof. In one embodiment, the PE interface may determine one or more updates based on a triggering event (e.g., geo-tag information, sensor information, user information, user behavior, service provider information, etc.) and/or based on a contextual trend associated with, for example, one or more users, locations, events, topics, and the like, wherein the data object may be updated with information determined from the triggering event and/or the contextual trend. In one embodiment, the triggering event and/or the contextual trend may be determined from database (e.g., historic data) available to the static processing mechanism. For example, a trend may indicate a movement of a plurality of users toward a particular location and/or event, wherein the data object may be updated to monitor and track the one or more trends based on one or more trends determined from, for example, historical data.

In one embodiment, the system 100 determines one or more computational chains, one or more parameters of the one or more computational chains, one or more data elements of the one or more computational chains, or a combination thereof associated with the at least one PE, wherein at least one data object includes, at least in part, the one or more computational chains, the one or more parameters, the one or more data elements, or a combination thereof. In one embodiment, encapsulated computational chains form PEs of stream processing mechanisms. In one embodiment, the updating of the at least one data object comprises, at least in part, causing a shaping of the one or more computational chains based, at least in part, on the one or more triggering events, the one or more contextual trends, or a combination thereof. For example, the shaping process may pass the PE as a data object to the static processing where it may update parameters, computations, and/or re-encode (e.g., marshalling) the updated computations, parameters, etc. back into data object for transmission to the dynamic process. In one embodiment, shaping is determining which computational chains may be selected for the processing, wherein one or more chains may be combined and encapsulated into one or more PEs for processing.

In one embodiment, the system 100 processes and/or facilitates a processing of the at least one data object to cause, at least in part, an updating of one or more components of the at least one static processing mechanism. In one embodiment, one or more new relationships and/or trends may be determined from a data object for utilization in updating data and/or one or more processes of the static process mechanism. In one instance, one or more trends and/or analytics from a data object may be utilized to cause an update to a static process, for example, to begin a process cycle outside of a predetermined schedule so to effectuate historical data and/or process parameters for updated analytics.

In one embodiment, the system 100 causes, at least in part, an aggregation of one or more outputs of the at least one dynamic processing mechanism and the one or more other outputs of the at least one static processing mechanism. In one embodiment, the PE interface aggregates output of the static process and the dynamic process. In one embodiment, the PE interface may request a first output from a first processing mechanism (e.g., the static process) and then provide the first output to a second processing mechanism (e.g., dynamic process), wherein the second processing mechanism may aggregate the first output with an output from the second process.

In one embodiment, the system 100 determines one or more outputs of at least one processing job based, at least in part, on the aggregation. In one embodiment, a processing mechanism (e.g., a dynamic process, a static process) and/or a PE interface may determine one or more outputs to one or more entities based, at least in part, on one or more aggregation of one or more outputs from one or more processing mechanisms. For example, a processing mechanism element (e.g., a server) and/or a service provider may utilize an aggregated output to provide an output to another element and/or another service provider.

In one embodiment, the processing platform 107, the service providers 105, and/or the UEs 101 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

By way of example, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 may be any type of mobile terminal, fixed terminal, or portable terminal including a mobile device, phone, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is noted that, in the various embodiments, described herein the term mobile device is used synonymously with UE 101, mobile terminal, mobile phone, and/or any other mobile device listed above. It is also contemplated that the UEs 101 can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like. In one embodiment, the UE 101 is a mobile device (e.g., a handset, a mobile phone, etc.) as described with respect to FIG. 11 below.

By way of example, processing platform 107, the service providers 105, and/or the UEs 101 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
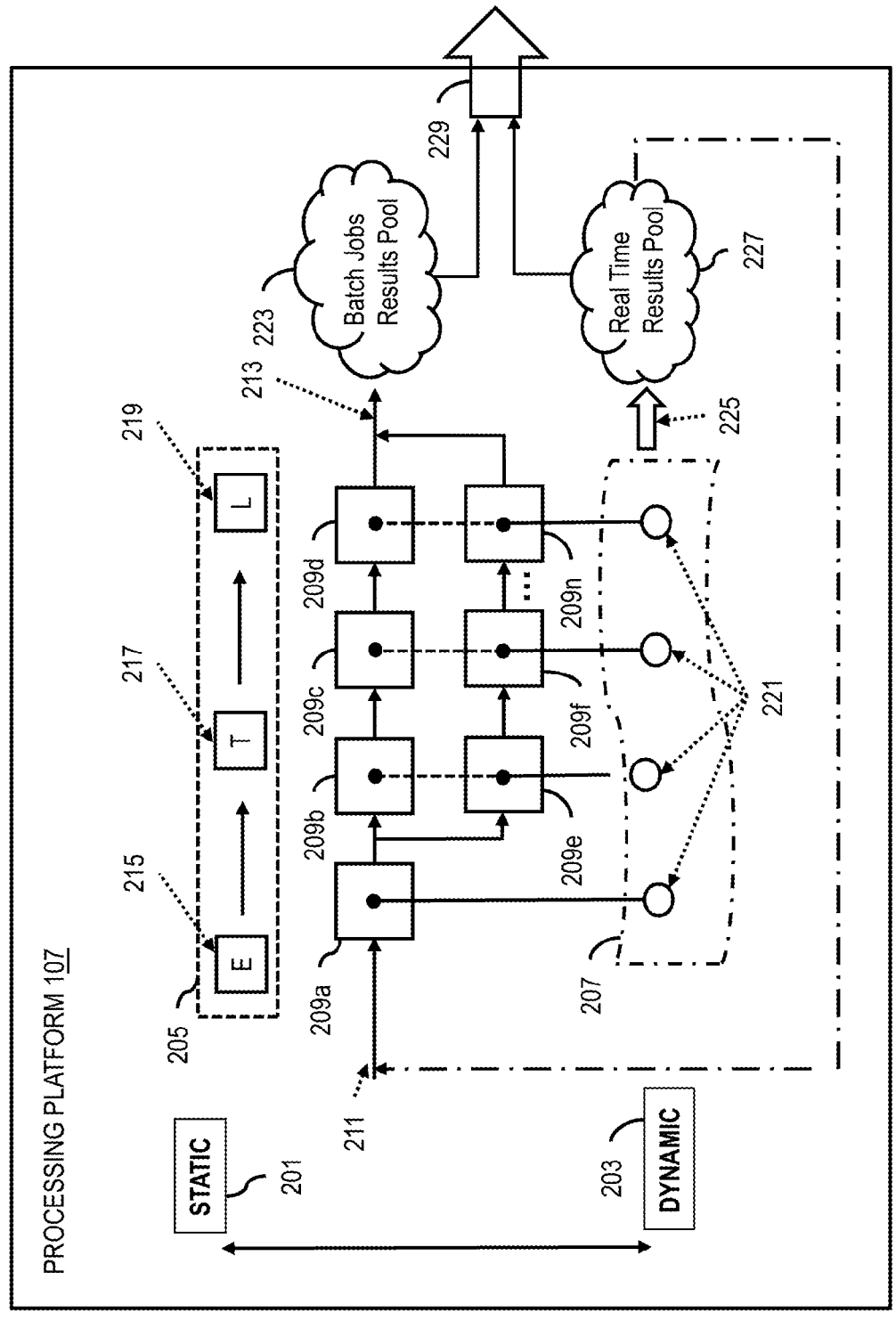
FIG. 2 is a diagram of components of a smart data processing platform, according to an embodiment.

FIG. 2 is a diagram of components of a processing platform, according to an embodiment. By way of example, the processing platform 107 may include one or more static processes 201 and one or more dynamic processes 203 wherein the static process 201 may utilize a map-reduce process 205 (e.g., batch job) and the dynamic process 203 may utilize a stream process 207. In a map-reduce process/job, one or more input data sets are split (mapped) into independent clusters (e.g., by a master process component) which are processed by one or more map processes (e.g., slave process components) in a parallel manner, and later, the process sorts outputs of the map processes which are then input to one or more reduce tasks for combining results of the one or more map processes and generating one or more integrated resultants.

In one embodiment, the static process may utilize computational and data closures 209a-209n with an input point at 211 and an output point at 213. The term "computational closure" refers to a particular data retrieval and computation procedure together with relations and communications among various processes including passing arguments, sharing process results, flow of data and process results, etc. The computation closures (e.g., a granular reflective set of instructions, data, and/or related execution context or state) provide the capability of slicing of computations and data for processes and transmitting the slices between devices, infrastructures, and processes.

In one embodiment, the computation closures are marshalled as one or more data objects to facilitate transfer and processing among processing platforms 107 (e.g., static or slow moving data systems such as analytics engines, and real-time stream processing systems such as S4 systems). In one embodiment, the closure marshalling may be generated and stored using Resource Description Framework (RDF) format. RDF is a family of World Wide Web Consortium (W3C) specifications originally designed as a metadata data model. It has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF URI reference (U) or a Blank Node (B), a predicate is an RDF URI reference (U), and an object is an RDF URI reference (U), a literal (L) or a Blank Node (B). A set of such triples is called an RDF graph. Table 1 shows an example RDF graph structure.

TABLE 1

| Subject | Predicate | Object |
| --- | --- | --- |
| uri://....../rule#CD-introduction, | rdf:type, | uri://............/Rule |
| uri://....../rule#CD-introduction, | uri://......./rule#assumption, | "c" |

The granularity may be achieved by the basic format of operation (e.g. RDF) within the specific computation environment. Furthermore, the reflectivity of processes (i.e. the capability of processes to provide a representation of their own behavior to be used for inspection and/or adaptation) may be achieved by encoding the behavior of the computation in RDF format. Additionally, the context may be assumed to be partly predetermined and stored as RDF in the information space and partly be extracted from the execution environment. It is noted that the RDF structures can be seen as subgraphs, RDF molecules (i.e., the building block of RDF graphs) or named graphs in the semantic information brokers (SIBs) of information spaces.

In certain embodiments marshalling the closures associated with a certain execution context enables the closures to be freely distributed among multiple components of the system 100, including remote processors associated with the UEs 101 and the processing platforms 107 via the communication network 105. The processes of closure assigning and migration to run-time environments may be performed based on a cost function which accepts as input variables for a cost determination algorithm those environmental or procedural factors that impact optimal processing capability from the perspective of the multiple UEs 101, remote processors (e.g., PEs 221, processing platforms 107, etc.) associated therewith, information space capacity, etc. Such factors may include, but are not limited to, the required processing power for each process, system load, capabilities of the available run-time environments, processing required to be performed, load balancing considerations, security considerations, latency, service availability, etc. As such, the cost function is, at least in part, an algorithmic or procedural execution for evaluating, weighing or determining the requisite operational gains achieved and/or cost expended as a result of the differing closure assignment and migration possibilities. In one embodiment, the assignment and migration process is performed in light of that which presents the least cost relative to environmental or functional conditions.

Further, the map-reduce process 205 may utilize a process including extraction 215 (E), transformation 217 (T), and loading 219 (L); wherein the extraction process includes extracting data from various data sources and the transformation stage includes series of rules or functions applied to the extracted data from the various sources in order to derive data for the loading stage, wherein the data is loaded into an end target (e.g., data warehouse, service provider, intermediate application, etc.). In one embodiment, the one or more PEs 221 may be extracted from the dynamic processing engine 203 and sent to the static processing 201 (e.g., extract, transform, and load (ETL) process) as data objects for processing, shaping (e.g., creation of hierarchical or nested sets of record-sets), changing, and/or adjusting, and after the processes, the PEs are sent back to the dynamic process 203, where the real-time PEs may be correlated with the static (e.g., historical) data. For example, the shaping process may pass the PEs as a data object to the static processing 201 where it may update parameters, computations, and/or re-encode (e.g., marshalling) the updated computations, parameters, etc. back into data object for transmission to the dynamic process 203. In various embodiments, the output 213 of the static process 201 is input to batch-jobs-results pool 223, and output 225 of the dynamic process 203 is input to real-time-results pool 227, wherein the results in the batch-jobs-results pool 223 and in the real-time-results pool 227 may be aggregated by one or more elements of the system 100 and provided as an output 229 to one or more elements (e.g., service providers, users, intermediary applications, etc.) of the system 100.

Figure 3:
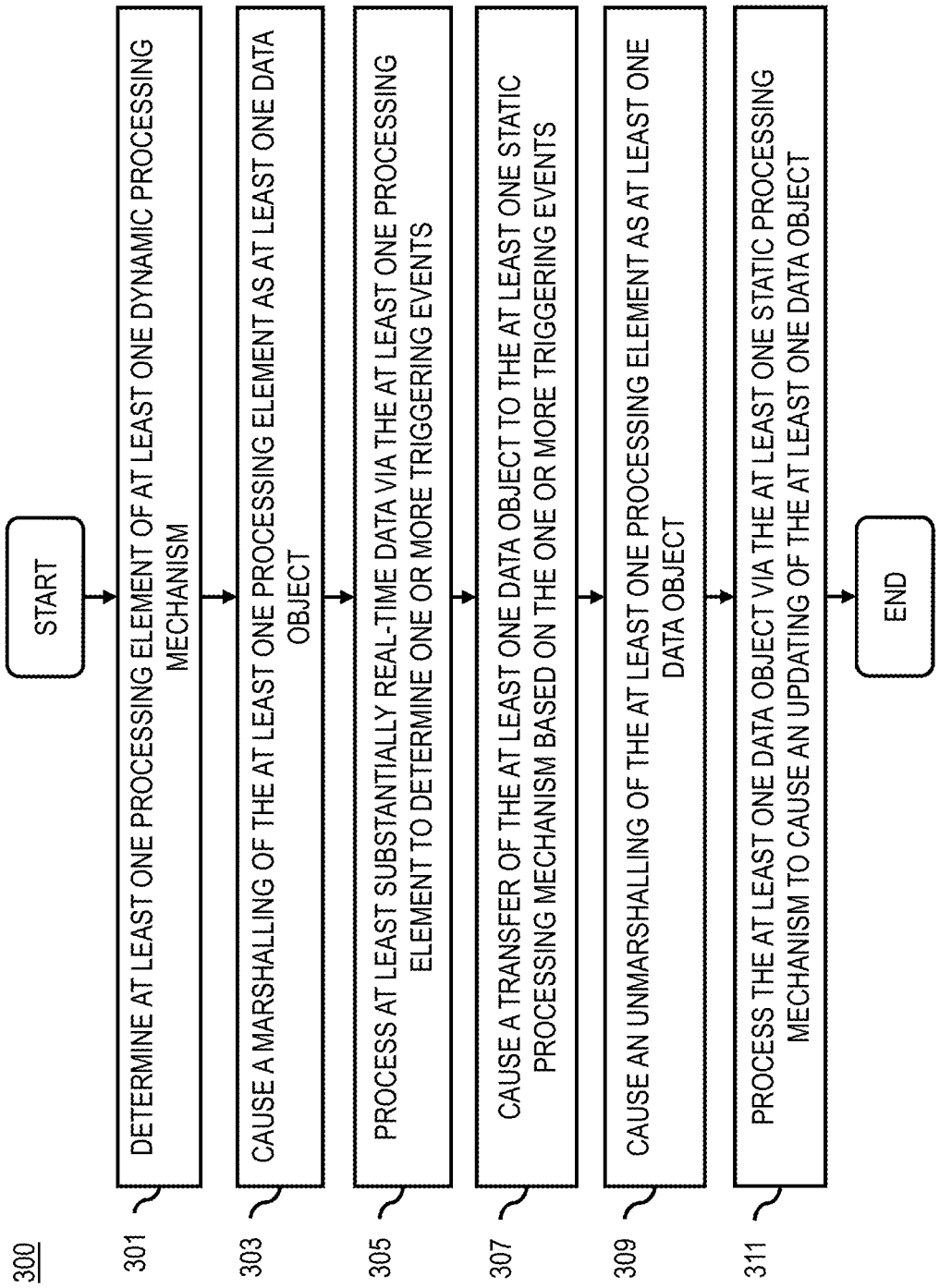
FIG. 3 is a flowchart of a process for, at least, determining and encapsulating a processing element, according to an embodiment.
Figure 10:
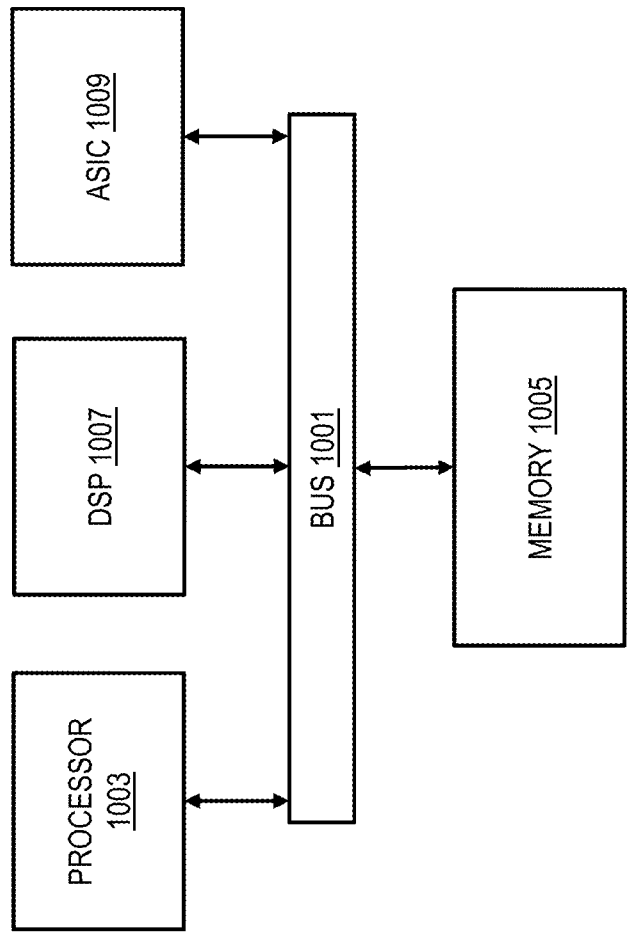
FIG. 10 is a diagram of a chip set that can be used to implement an embodiment of the invention.

FIG. 3 is a flowchart of a process for, at least, determining and encapsulating a PE, according to an embodiment. In one embodiment, the processing platform 107 and/or the service providers 105 may perform all or a portion of the process 300 and are implemented in, for instance, a chip set including a processor and a memory as shown in FIG. 10. As such, the processing platform 107 and/or the service providers 105 can provide means for accomplishing various parts of the process 300 as well as means for accomplishing other processes in conjunction with other components of the system 100. Throughout this process, the processing platform 107 is referred to as completing various portions of the process 300, however, it is understood that other components of the system 100 can perform some of and/or all of the process steps. Further, in various embodiments, the processing platform 107 may be implemented in one or more entities of the system 100.

In step 301, the processing platform 107 determines at least one PE of at least one dynamic processing mechanism (e.g., engine). In one embodiment, a processing platform 107 may include a dynamic process (e.g., stream process), which may operate on real-time or near real-time data stream to determine and/or process one or more PEs. For example, a PE may include computational code and/or data, which may be associated with one or more information items from a user and/or a service provider (e.g., a Twitter® feed, location based information, etc.), wherein the PEs may indicate a most common topic, location, hash-tag, and the like. In another example, a PE may include data as well as executing code where one or more functions of a process may be defined (e.g., process a counter, determine occurrence of certain data patterns or popularity of a certain topic, traffic analysis, route planning, reverse geocoding (RGC), etc.) In one embodiment, the processing platform 107 may include a static process, which may determine and/or process the one or more PEs. For example, the static process may preform one or more processes associated the one or more PEs, one or more dynamic processes, one or more distributed processes, or a combination thereof. In one embodiment, one or more other elements (e.g., servers, processors, etc.) of the system 100 may determine and/or process the one or more PEs instead of and/or in conjunction with the, processing platform, the dynamic process, and/or the static process.

In step 303, the processing platform 107 causes, at least in part, a marshalling of the at least one PE as at least one data object, wherein the at least one data object is processable by at least one static processing mechanism. In one embodiment, the at least one static processing mechanism operates, at least in part, in a batch mode with a predetermined batch frequency; and wherein the at least one dynamic processing mechanism, the at least one PE, or a combination thereof operate, at least in part, in substantially real-time or at a frequency greater that the predetermined batch frequency. In one embodiment, the at least one static processing mechanism is associated with performing, at least in part, slow moving data analytics; and wherein the at least one dynamic processing mechanism, the at least one PE, or a combination thereof are associated with performing, at least in part, fast moving data analytics.

In step 305, the processing platform 107 processes and/or facilitates a processing of at least substantially real-time data via the at least one PE to determine one or more triggering events. In one embodiment, the dynamic processor evaluates, processes, analyzes real-time and/or near real-time data (e.g., from users) to determine one or more triggering events, wherein the triggering events may be predetermined and/or determined based on one or more criteria. For example, the triggering event may be based on a location, an event type, a user profile, a service provider, and the like. In one embodiment, the one or more triggering events include, at least in part, one or more contextual trends occurring above at least one threshold level. For example, a threshold value may include a number of users, a particular geographical location, a certain communication topic, and the like.

In step 307, the processing platform 107 causes, at least in part, a transfer of the at least one data object to the at least one static processing mechanism based, at least in part, on the one or more triggering events. In one embodiment, one or more triggering events (e.g., an event at a certain geographical location) may cause a PE interface to transfer one or more data objects to one or more static processing mechanisms (e.g., batch jobs) for utilization in one or more processes, wherein the processing may be based, at least in part, on the information encapsulated in the data object and historical data available to the static processor.

In step 309, the processing platform 107 causes at least in part, an unmarshalling of the at least one processing element as at least one data object, wherein the at least one data object is processable by the at least one static processing mechanism. In one embodiment, and unmarshalling process is to decode the object that was marshalled. For example, in a distributed computing environment, an object is marshalled (e.g., encoded, serialized) for sending the object from a client to a server side or from one process to another, and an unmarshalling is a process to decode (e.g., de-serialize) the encoded object at the receiving side.

In step 311, the processing platform 107 processes and/or facilitates a processing of the at least one data object via the at least one static processing mechanism to cause, at least in part, an updating of the at least one data object based, at least in part, on the one or more triggering events, the one or more contextual trends, or a combination thereof. In one embodiment, the PE interface may determine one or more updates based on a triggering event (e.g., geo-tag information, sensor information, user information, user behavior, service provider information, etc.) and/or based on a contextual trend associated with, for example, one or more users, locations, events, topics, and the like, wherein the data object may be updated with information determined from the triggering event and/or the contextual trend. In one embodiment, the triggering event and/or the contextual trend may be determined from database (e.g., historic data) available to the static processing mechanism. For example, a trend may indicate a movement of a plurality of users toward a particular location and/or event, wherein the data object may be updated to monitor and track the one or more trends based on one or more trends determined from, for example, historical data.

Figure 4:
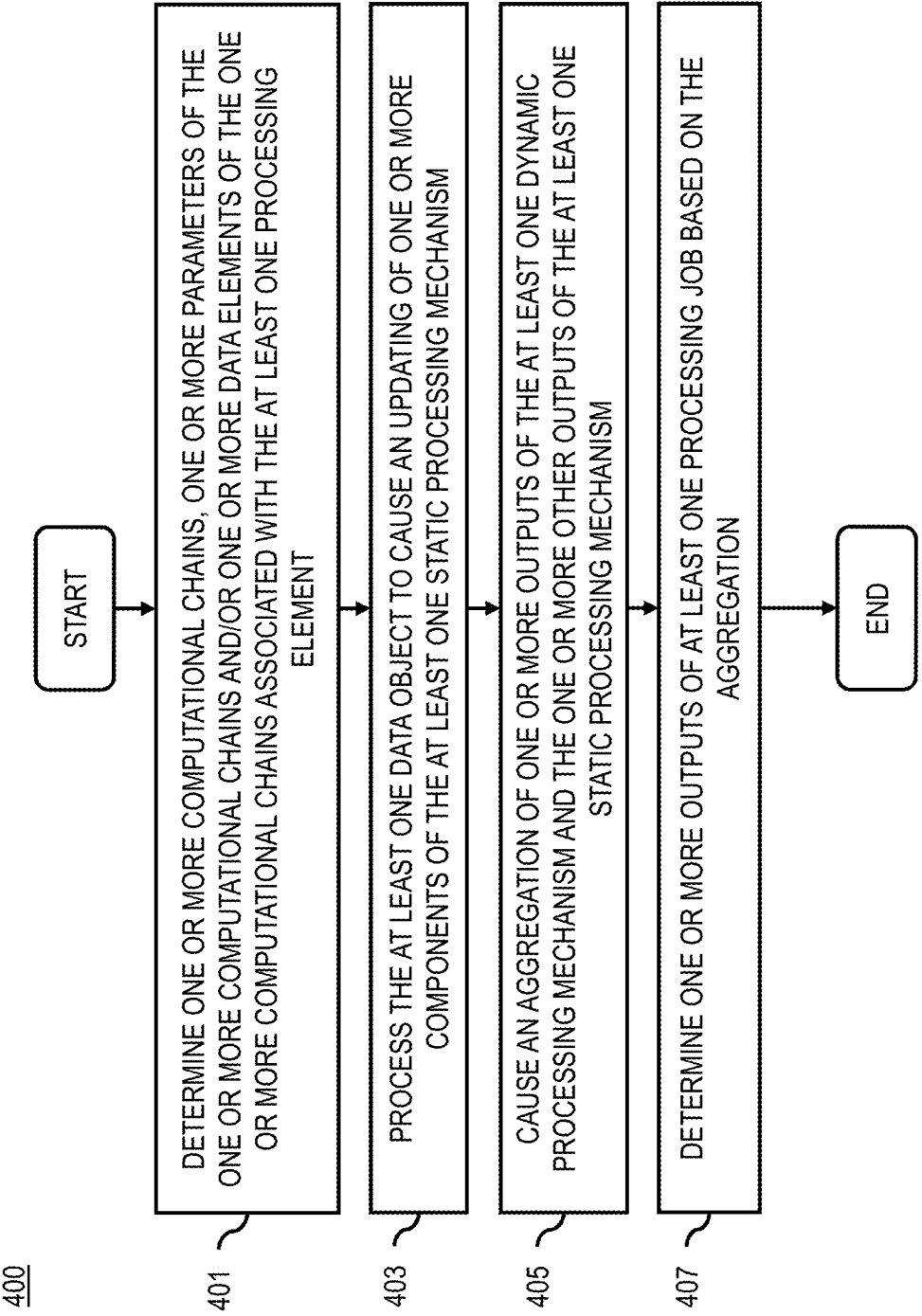
FIG. 4 is a flowchart of a process for, at least, determining a computational chain and related parameters associated with a processing element, according to an embodiment.

FIG. 4 is a flowchart of a process for, at least, determining a computational chain and related parameters associated with a PE, according to an embodiment. In one embodiment, the processing platform 107 and/or the service providers 105 may perform all or a portion of the process 400 and are implemented in, for instance, a chip set including a processor and a memory as shown in FIG. 10. As such, the processing platform 107 and/or the service providers 105 can provide means for accomplishing various parts of the process 400 as well as means for accomplishing other processes in conjunction with other components of the system 100. Throughout this process, the processing platform 107 is referred to as completing various portions of the process 400, however, it is understood that other components of the system 100 can perform some of and/or all of the process steps. Further, in various embodiments, the processing platform 107 may be implemented in one or more entities of the system 100.

In step 401, the processing platform 107 determines one or more computational chains, one or more parameters of the one or more computational chains, one or more data elements of the one or more computational chains, or a combination thereof associated with the at least one PE, wherein at least one data object includes, at least in part, the one or more computational chains, the one or more parameters, the one or more data elements, or a combination thereof. In one embodiment, encapsulated computational chains form PEs of stream processing mechanisms. In one embodiment, the updating of the at least one data object comprises, at least in part, causing a shaping of the one or more computational chains based, at least in part, on the one or more triggering events, the one or more contextual trends, or a combination thereof. For example, the shaping process may pass the PE as a data object to the static processing where it may update parameters, computations, and/or re-encode (e.g., marshalling) the updated computations, parameters, etc. back into data object for transmission to the dynamic process. In one embodiment, shaping is determining which computational chains may be selected for the processing, wherein one or more chains may be combined and encapsulated into one or more PEs for processing.

In step 403, the processing platform 107 processes and/or facilitates a processing of the at least one data object to cause, at least in part, an updating of one or more components of the at least one static processing mechanism. In one embodiment, one or more new relationships and/or trends may be determined from a data object for utilization in updating data and/or one or more processes of the static process mechanism. In one instance, one or more trends and/or analytics from a data object may be utilized to cause an update to a static process, for example, to begin a process cycle outside of a predetermined schedule so to effectuate historical data and/or process parameters for updated analytics.

In step 405, the processing platform 107 cause, at least in part, an aggregation of one or more outputs of the at least one dynamic processing mechanism and the one or more other outputs of the at least one static processing mechanism. In one embodiment, the PE interface aggregates output of the static process and the dynamic process. In one embodiment, the PE interface may request a first output from a first processing mechanism (e.g., the static process) and then provide the first output to a second processing mechanism (e.g., dynamic process), wherein the second processing mechanism may aggregate the first output with an output from the second process.

In step 407, the processing platform 107 determining one or more outputs of at least one processing job based, at least in part, on the aggregation. In one embodiment, a processing mechanism (e.g., a dynamic process, a static process) and/or a PE interface may determine one or more outputs to one or more entities based, at least in part, on one or more aggregation of one or more outputs from one or more processing mechanisms. For example, a processing mechanism element (e.g., a server such as the computer system described with respect to FIG. 9 below) and/or a service provider may utilize an aggregated output to provide an output to another element and/or another service provider.

Figure 5:
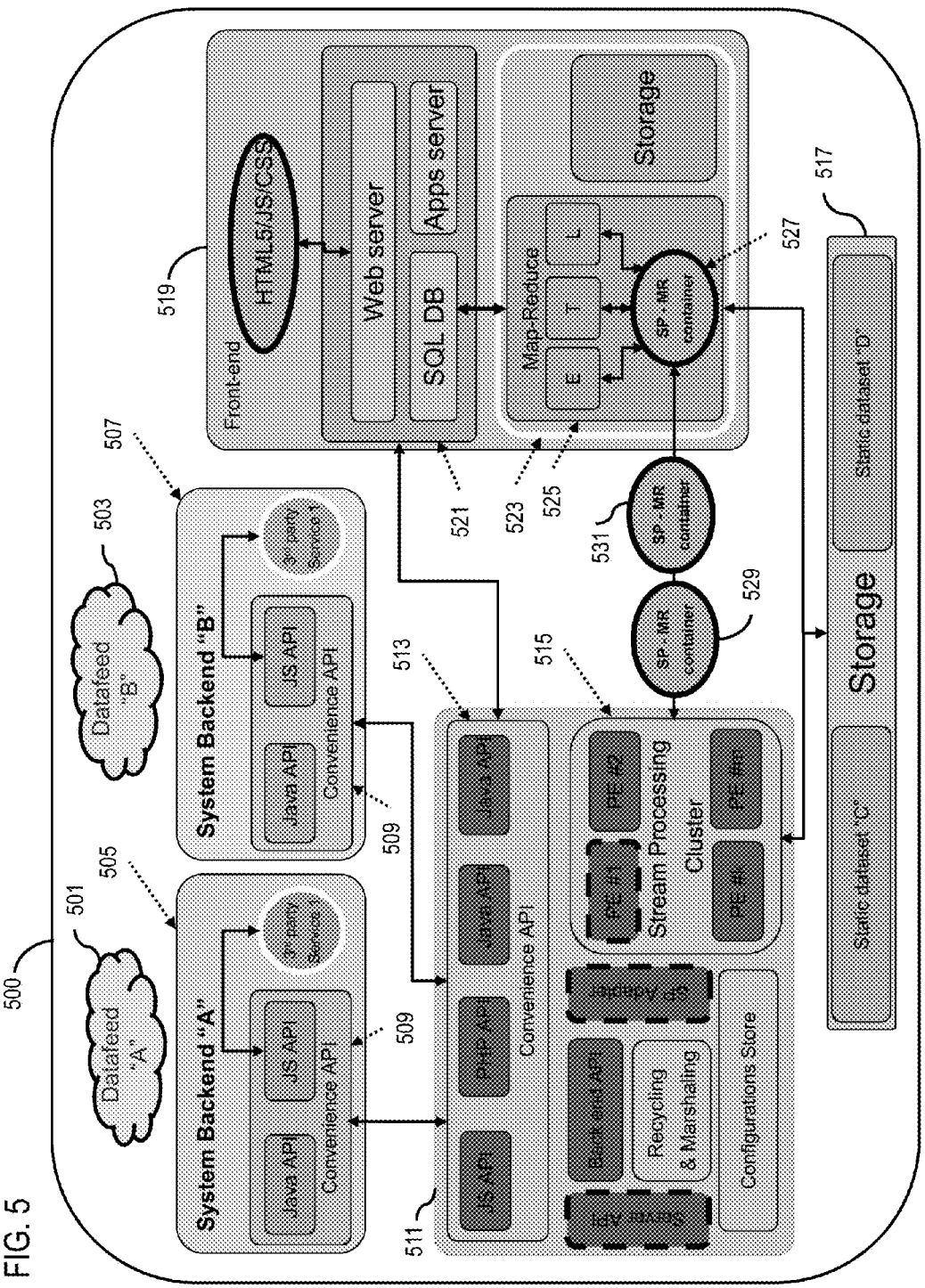
FIG. 5 is a diagram of a smart data processing architecture, according to an embodiment.

FIG. 5 is a diagram of a data-processing architecture, according to an embodiment. In one embodiment, the architecture 500 includes Datafeed "A" 501 and Datafeed "B" 503, for example, from various service providers (e.g., Twitter®, Wikipedia, etc.), wherein the Datafeed "A" may utilize a system backend "A" 505 and the Datafeed "B" may utilize a system backend "B" 507 for communicating and/or processing various datafeeds, programming interface, service requests, and the like. In various embodiments, the system backends "A" 505 and "B" 507 may include various components, for example, a convenience API module 509 including a Java API, a Java script (JS) API, and one or more third party services, wherein the convenience APIs may be utilized for communication and/or programming interface with a processing platform 511. In various embodiments, the processing platform 511 includes a convenience API module 513, which may include various APIs (e.g., Java, JS, PHP, etc.), back-end APIs, server APIs, simple scalable stream processing system (SP, e.g., S4 or Storm or the like) adapter, and the like, wherein the SP adapter (e.g., a client) allows third-party clients to send and receive events from an SP cluster/engine. In one embodiment, the processing platform 511 includes an stream processing cluster 515 (e.g., dynamic process) which may further include an S4 engine and various PEs with access to one or more data stores 517, which may store various data (e.g., user data, sensor data, historical data, etc.) In general, the stream processing cluster is a general-purpose distributed platform that allows for development of applications for processing continuous unbounded streams of data. Further, the processing platform 511 may include a configurations store including various configurations (e.g., service provider, processing, etc.) and a recycling and marshalling module whereby one or more processes may be utilized to transform memory representation of an object to a data format suitable for storage or transmission whereby the data may need to be moved between different parts of one or more processes. In one embodiment, the architecture 500 includes a system front-end 519 comprising web server and database management and configuration applications 521, which may include MySQL, Apache, Tomcat, and the like web servers and server software. Further, the system front-end 519 includes a static processing module 523 which may include one or more data stores, one or more distributed data systems (e.g., information spaces), and distributed processing and management module 525 (Map-Reduce, MR for batch jobs, e.g. Hadoop), which may utilize a map-reduce process including extract, transform, and load (ETL) processes on static data 527 and/or data sets 529 and 531 (e.g., SP-MR containers) from the stream processing cluster 515. In one embodiment, one or more PEs are transferred between the stream processing cluster 515 and the static process 525 via the SP-MR containers including data, code, configuration, etc. It is noted that various elements of the architecture 500 may be implemented in one or more modules, for example, the stream processing cluster 515 (e.g., dynamic process) and the static processing module 523 may be implemented in one or more modules for achieving substantially same functionality.

Figure 6:
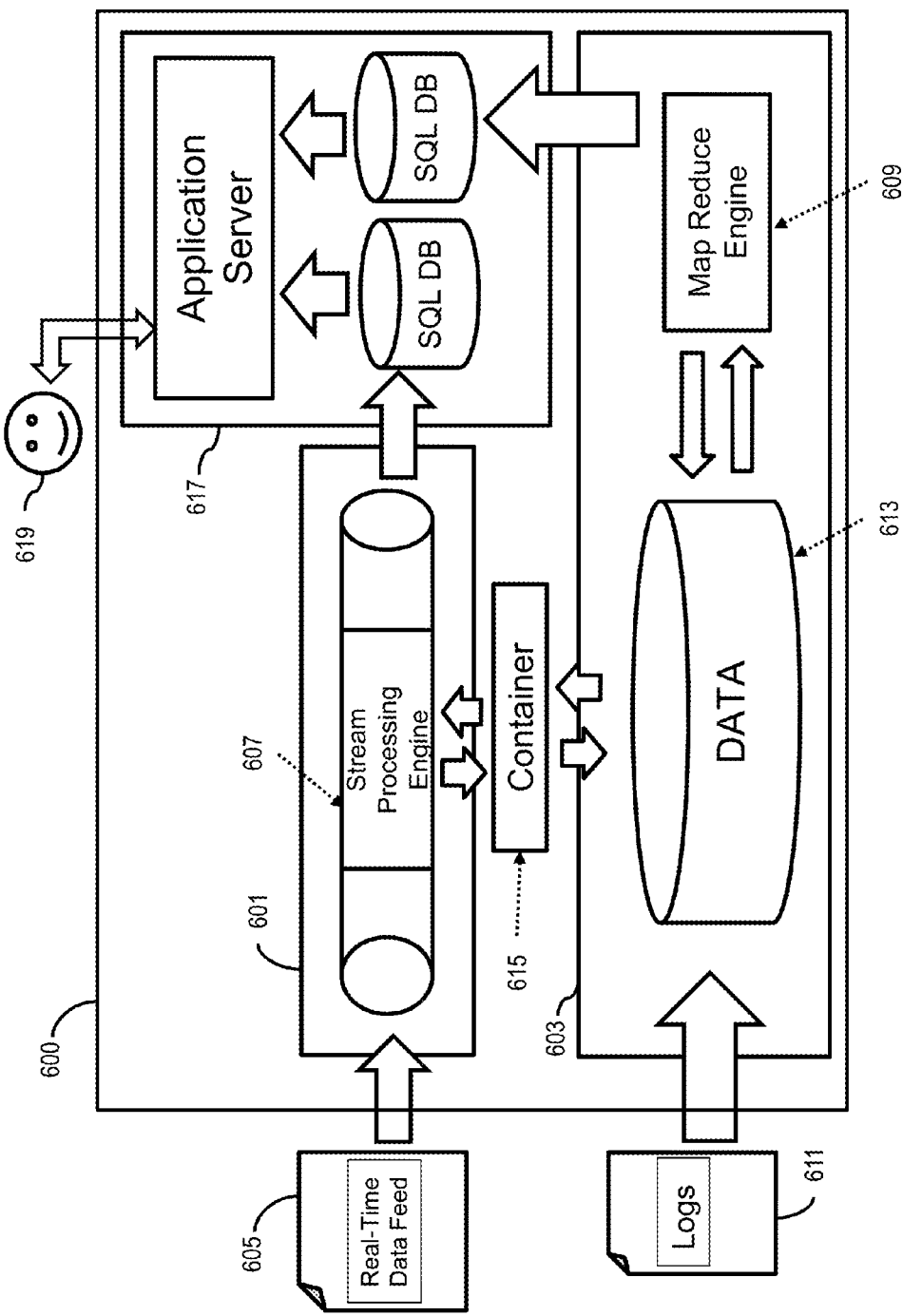
FIGS. 6 and 7 are diagrams of processing platforms including adaptive and user context awareness, according to various embodiments.
Figure 7:
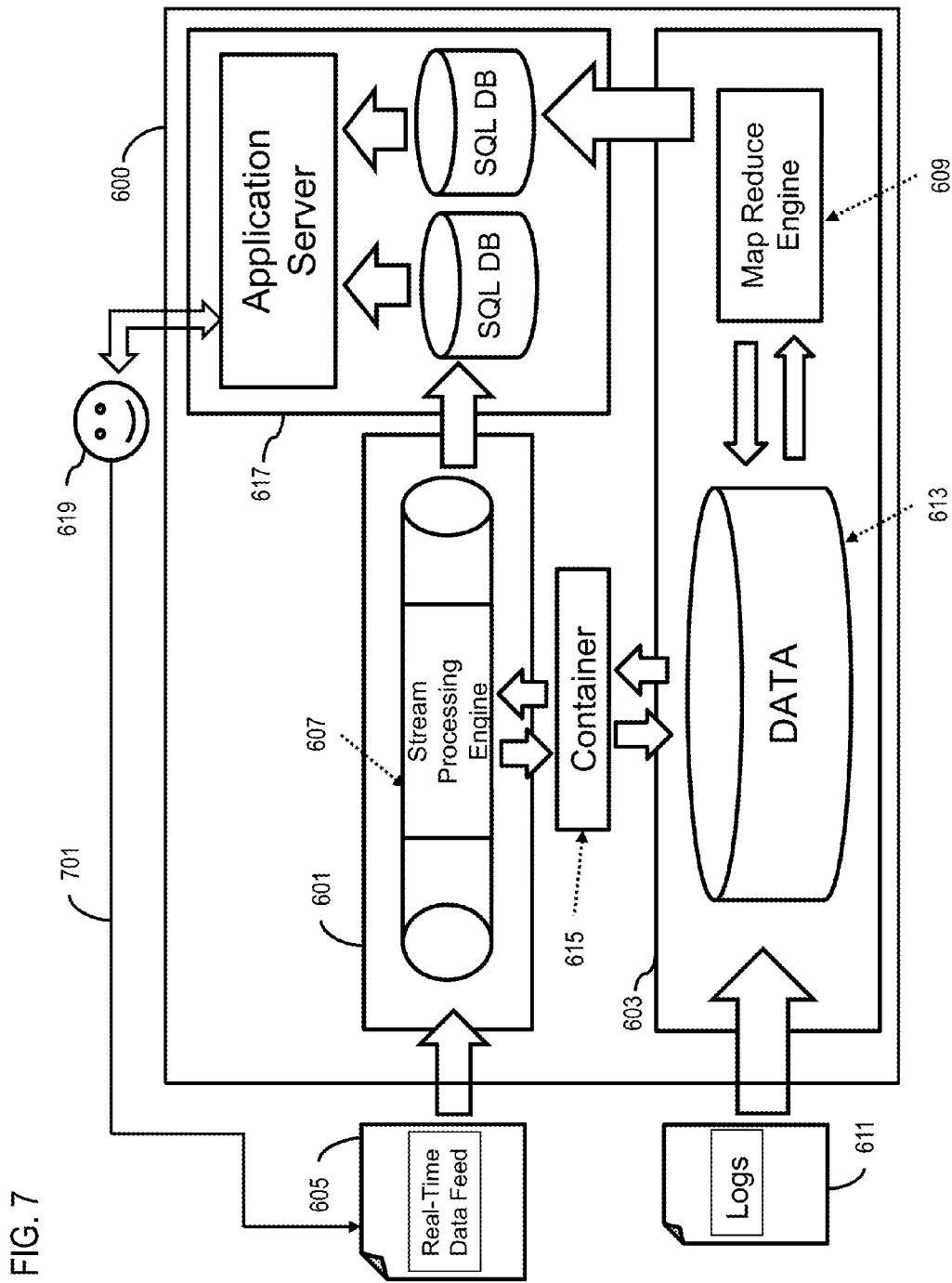

FIGS. 6 and 7 are diagrams of processing platforms including adaptive and user context awareness, according to various embodiments. FIG. 6 shows processing platform 600 including a dynamic processing mechanism 601 (e.g., stream processing) and a static processing mechanism 603 (e.g., batch job). In one embodiment, the dynamic processing mechanism 601 receives real-time and/or near real-time data from one or more data feeds 605 (e.g., one or more data and/or service providers), where the data is processed by a stream processing engine 607 (e.g., stream processing framework, context mapping algorithms and data-structures, etc.), wherein processing results may be kept (e.g., stored at an intermediate component such as database 115) and/or output in real-time (e.g., stream) to one or more applications. In one embodiment, the static processing mechanism 603 utilizes a map-reduce engine 609 to manage and process data from one or more data logs 611 and data 613 (e.g., Hadoop Distributed File System (HDFS)). In one embodiment, a container 615 is utilized as a process and/or as an interface between the dynamic process 601 and the static process 603 to extract one or more PEs from the stream processing engine 607, treat/shape the PEs as various data objects, and input them into the static process 603 (e.g., HDFS) for processing (e.g., parse, analyze, etc.) according to map-reduce engine 609. In one example, the shaping process may an encapsulate the one or more PEs as at least one data object, pass the PE as a data object to the static processing where it may update parameters, computations, and/or re-encode (e.g., marshalling) the updated computations, parameters, etc. back into data object for transmission to the dynamic process. Further, a PE may include computational code and/or data, which may be associated with data from a user and/or a service provider (e.g., a Twitter® feed, location based information, etc.)

In various embodiments, the stream processing engine 607 and the map-reduce engine 609 may utilize one or more applications, algorithm, software, and the like for performing one or more tasks for one or more processes. In one embodiment, the static processing mechanism 603 operates in a batch-mode with a predetermined batch frequency, for example, daily, weekly, etc., and the dynamic processing mechanism 601 operates in substantially real-time or at a frequency greater that the predetermined batch frequency. In one embodiment, processing results from the static processing mechanism 603 are transferred back to the dynamic processing mechanism 601 as updated PEs (e.g., including updated parameters, computational codes, etc.), wherein one or more configurations of the dynamic processing mechanism 601 may be updated according to the updated PEs (e.g., one or more trends, additional data, updated codes, etc.) In one embodiment, the processing platform 600 includes an applications server module 617, which may include various applications and servers, for example, MySQL database, where inputs from the dynamic process 601 and the static process 603 may be aggregated and presented to one or more users 619 and/or one or more service providers (e.g., search engines, data mining services, etc.)

As shown in FIG. 7, along with the real-time data feed 605, contextual user data feed 701 may also be input to the dynamic process 601. For example, one or more user data/information-items may be determined (e.g., user location, user profile, user applications, user device, etc.) from a user 619 and may be utilized/shared according to one or more user and/or service provider privacy policies.

Figure 8:
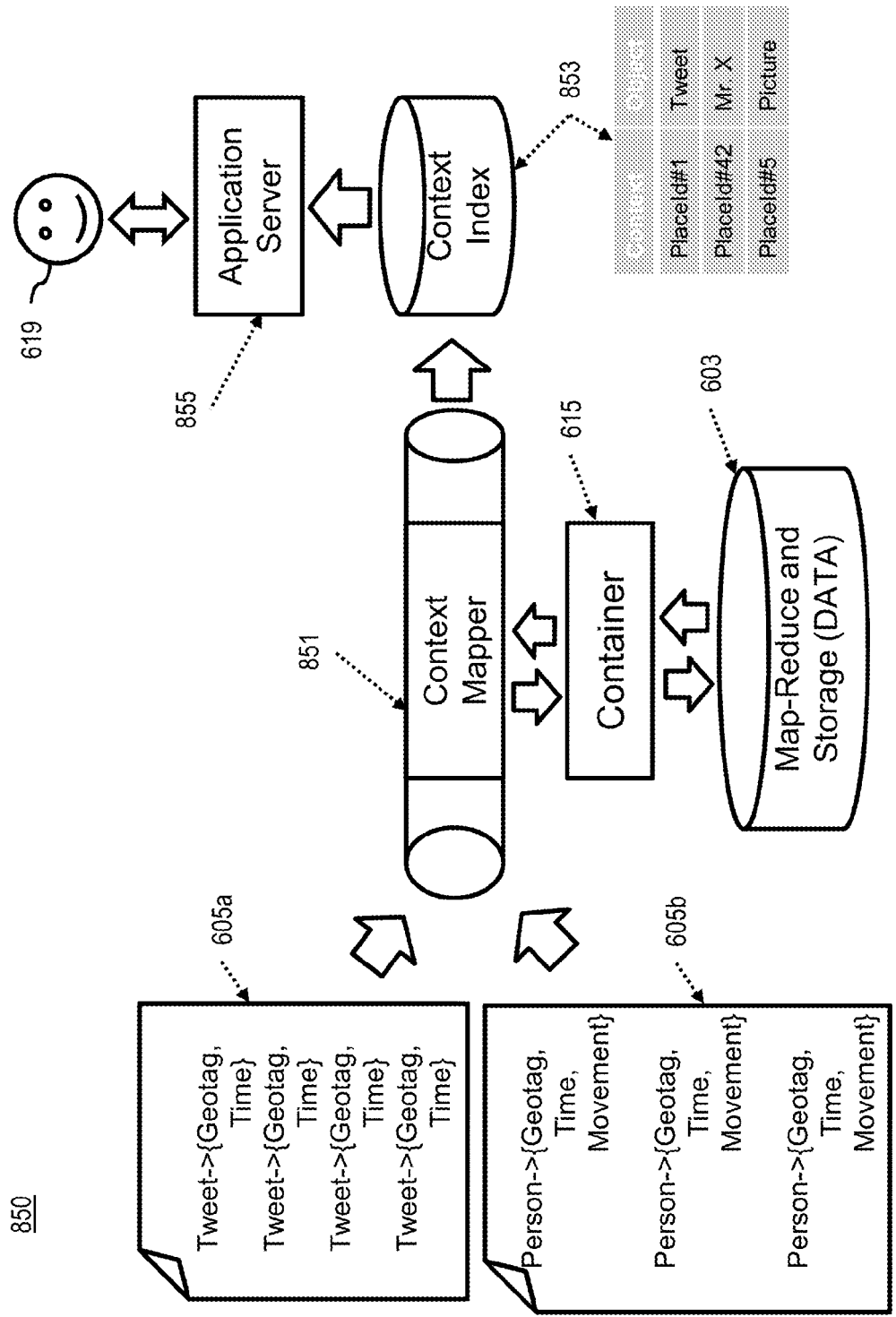
FIG. 8 is a diagram of a processing platform including context-aware adaptive real-time data interface, according to an embodiment.

FIG. 8 is a diagram of a processing platform including context-aware adaptive real-time data interface, according to an embodiment. As shown in processing platform 850, data feeds 605a and 605b are sequences of objects mapped to various context, for example, (Object→{Geotag, Motion, Movement, Time}). However, a challenge is to map the context such that an application may perceive it as collections of relevant objects that change over time, wherein context may be any information that can be used to characterize a situation of entities (e.g., a person, place, object, etc.), which are considered relevant to the interaction between a user and an application. In one embodiment, context mapper 851 may utilize an algorithm running in a stream processing framework where objects (tweets, persons, places, etc.) are mapped to various context (place, address, etc.), for example, mapping tweets (e.g., from Twitter®) and places to places or addresses. Further, the container 615 may include one or more processes for updating dataset and structure used by the context mapper 851 in the background based on perceived trends in the datafeeds 605a and 605b. Furthermore, context index 853 may contain an index of objects keyed to relevant context, wherein application server 855 may contain various components for context-aware applications to process the context.

The processes described herein for smart data processing methods for more accurate and comprehensive results may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
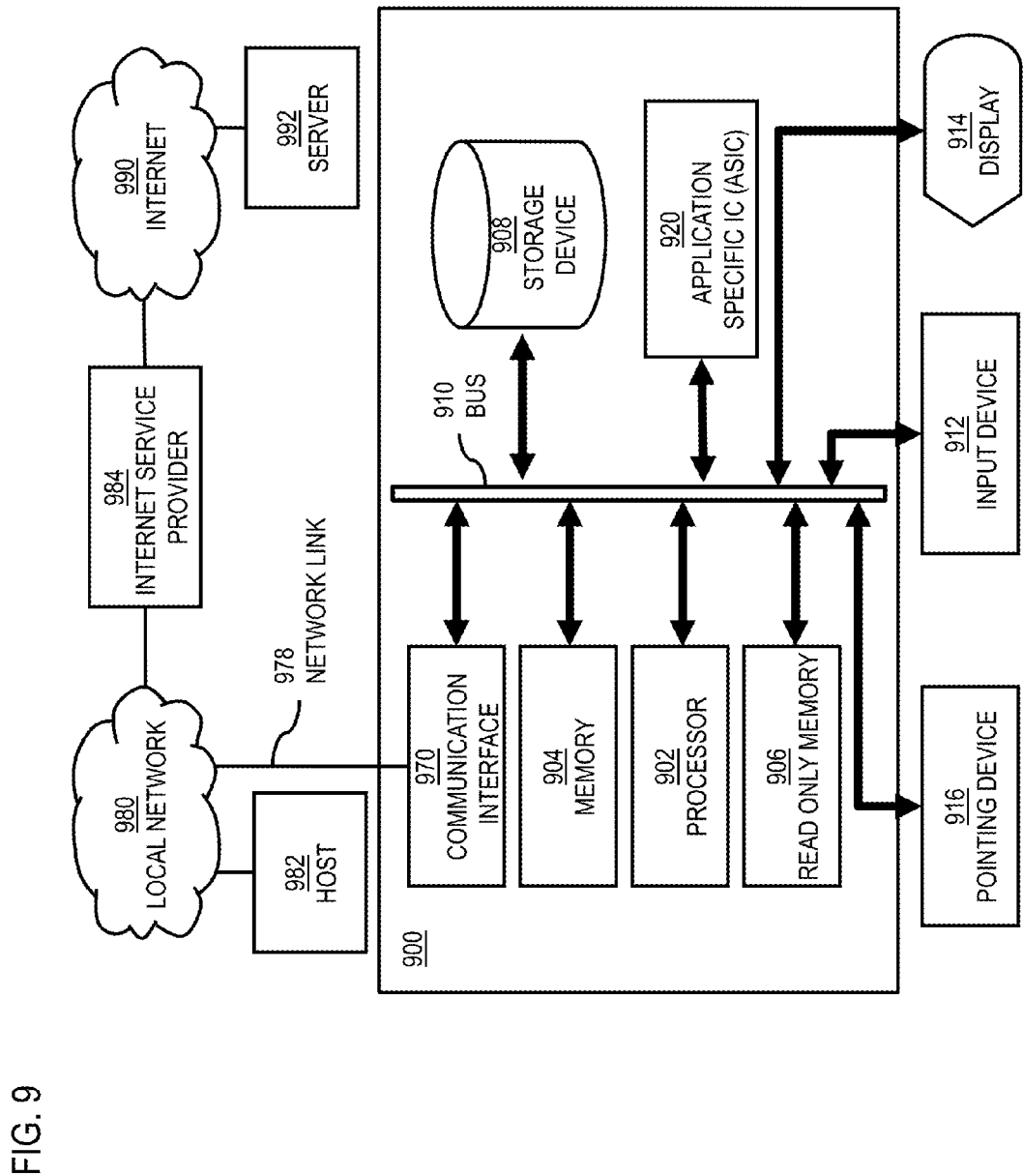
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) for smart data processing for more accurate and comprehensive results as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of smart data processing for more accurate and comprehensive results.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to smart data processing for more accurate and comprehensive results. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for smart data processing for more accurate and comprehensive results. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for smart data processing for more accurate and comprehensive results, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 111 for smart data processing for more accurate and comprehensive results.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed for smart data processing for more accurate and comprehensive results as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of smart data processing for more accurate and comprehensive results.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein for smart data processing for more accurate and comprehensive results. The memory 1005 also stores the data associated with or generated by the execution of the inventive steps.

Figure 11:
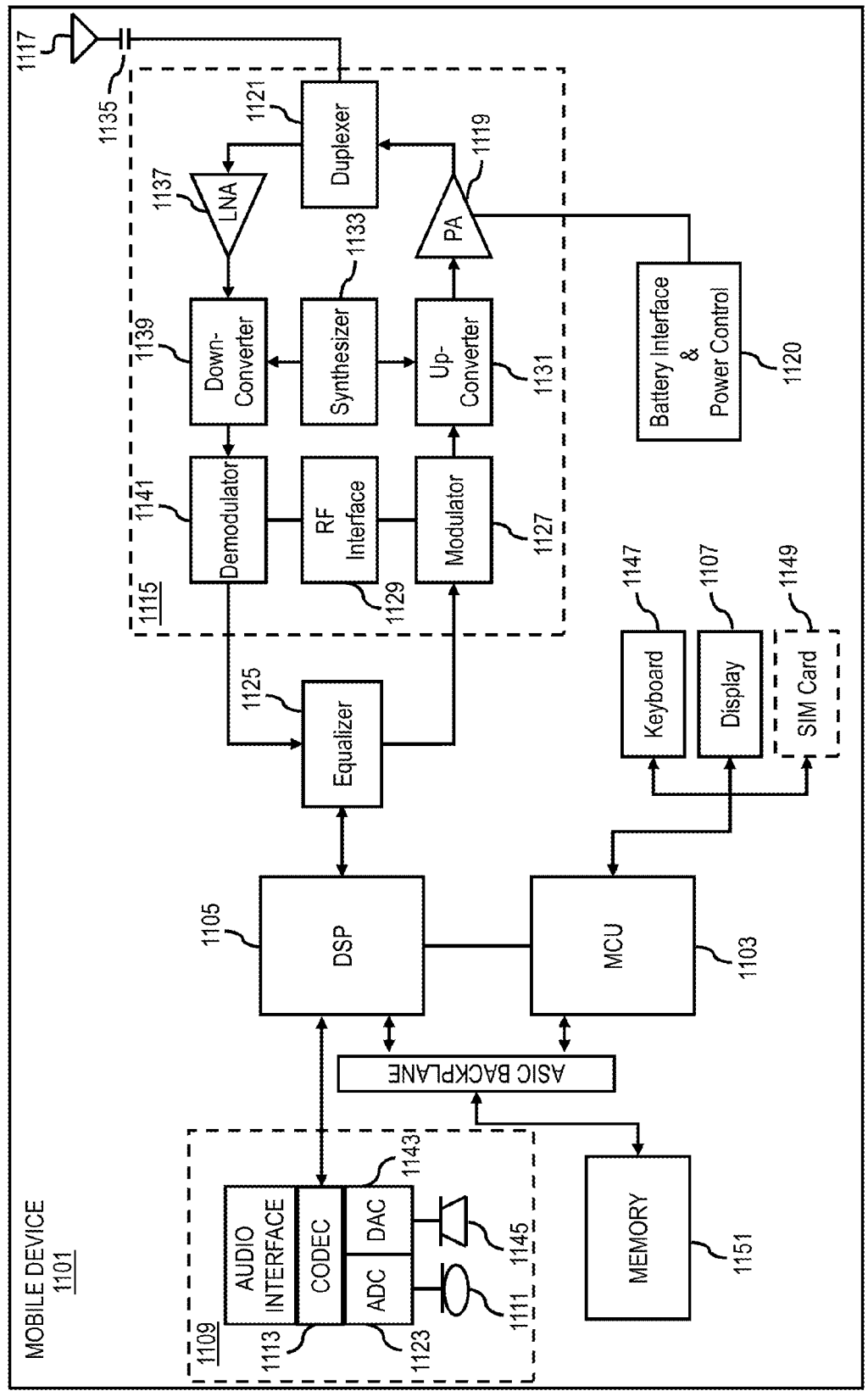
FIG. 11 is a diagram of a mobile device that can be used to implement an embodiment of the invention.

FIG. 11 is a diagram of exemplary components of a mobile device (e.g., mobile terminal, mobile phone, handset, etc.) for communications, which is capable of operating in the system of FIG. 1, according to one embodiment. In some embodiments, mobile terminal 1101, or a portion thereof, constitutes a means for performing one or more steps of smart data processing for more accurate and comprehensive results. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of smart data processing for more accurate and comprehensive results. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 for smart data processing for more accurate and comprehensive results. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Additionally, sensors module 1153 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1101 (e.g., a mobile phone), a user of the mobile terminal 1101, an environment of the mobile terminal 1101 and/or the user, or a combination thereof, wherein the data may be collected, processed, stored, and/or shared with one or more components and/or modules of the mobile terminal 1101 and/or with one or more entities external to the mobile terminal 1101.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining via a processor at least one processing element of at least one dynamic processing mechanism;
   causing, at least in part, a marshalling via the processor of the at least one processing element as at least one data object;
   transferring of the at least one data object to at least one static processing mechanism;
   processing of the at least one data object by the at least one static processing mechanism; and
   after processing, transferring the at least one data object back to the at least one dynamic processing mechanism.

2. The method of claim 1, further comprising:
   a processing of at least substantially real-time data via the at least one processing element to determine one or more triggering events,
   wherein, the transferring of the at least one data object to the at least one static processing mechanism is based, at least in part, on the one or more triggering events, and
   wherein the one or more triggering events include, at least in part, one or more contextual trends occurring above at least one threshold level.

3. The method of claim 2, further comprising:
   unmarshalling of the at least one processing element as the at least one data object.

4. The method of claim 2, wherein the processing of the at least one data object via the at least one static processing mechanism causes, at least in part, an updating of the at least one data object based, at least in part, on the one or more triggering events, the one or more contextual trends, or a combination thereof.

5. The method of claim 4, further comprising:
   at least one determining of one or more computational chains, one or more parameters of the one or more computational chains, one or more data elements of the one or more computational chains, or a combination thereof associated with the at least one processing element,
   wherein at least one data object includes, at least in part, the one or more computational chains, the one or more parameters, the one or more data elements, or a combination thereof.

6. The method of claim 5, wherein the updating of the at least one data object comprises, at least in part, causing a shaping of the one or more computational chains based, at least in part, on the one or more triggering events, the one or more contextual trends, or a combination thereof.

7. The method of claim 1, wherein the processing the processing of the at least one data object causes, at least in part, updating of one or more components of the at least one static processing mechanism.

8. The method of claim 1,
   aggregating of one or more outputs of the at least one dynamic processing mechanism and the one or more other outputs of the at least one static processing mechanism; and
   at least one determination of one or more outputs of at least one processing job based, at least in part, on the aggregating.

9. The method of claim 1, wherein the at least one static processing mechanism operates, at least in part, in a batch mode with a predetermined batch frequency; and wherein the at least one dynamic processing mechanism, the at least one processing element, or a combination thereof operate, at least in part, in substantially real-time or at a frequency greater that the predetermined batch frequency.

10. The method of claim 1, wherein the at least one static processing mechanism is associated with performing, at least in part, slow moving data analytics; and wherein the at least one dynamic processing mechanism, the at least one processing element, or a combination thereof are associated with performing, at least in part, fast moving data analytics.

11. An apparatus comprising:
    at least one processor; and
    at least one memory including computer program code for one or more programs,
    the at least one memory and the computer program code configured to, with the at least one processor, cause the apparatus to perform at least the following,
    determine at least one processing element of at least one dynamic processing mechanism;
    cause a marshalling via the processor of the at least one processing element as at least one data object;
    transfer of the at least one data object to at least one static processing mechanism;
    process the at least one data object by the at least one static processing mechanism; and
    after the process, transfer the at least one data object back to the at least one dynamic processing mechanism.

12. The apparatus of claim 11, wherein the apparatus is further caused to:
    process and/or facilitate a processing of at least substantially real-time data via the at least one processing element to determine one or more triggering events,
    wherein the transfer of the at least one data object to the at least one static processing mechanism based, at least in part, on the one or more triggering events, and
    wherein the one or more triggering events include, at least in part, one or more contextual trends occurring above at least one threshold level.

13. The apparatus of claim 12, wherein the apparatus is further caused to:

cause, at least in part, an unmarshalling of the at least one processing element as at least one data object.

14. The apparatus of claim 12, wherein the process of the at least one data object via the at least one static processing mechanism causes, at least in part, an updating of the at least one data object based, at least in part, on the one or more triggering events, the one or more contextual trends, or a combination thereof.

15. The apparatus of claim 14, wherein the apparatus is further caused to:

determine one or more computational chains, one or more parameters of the one or more computational chains, one or more data elements of the one or more computational chains, or a combination thereof associated with the at least one processing element, wherein at least one data object includes, at least in part, the one or more computational chains, the one or more parameters, the one or more data elements, or a combination thereof.

16. The apparatus of claim 15, wherein the updating of the at least one data object comprises, at least in part, causing a shaping of the one or more computational chains based, at least in part, on the one or more triggering events, the one or more contextual trends, or a combination thereof.

17. The apparatus of claim 11, wherein process of the at least one data object causes, at least in part, an updating of one or more components of the at least one static processing mechanism.

18. The apparatus of claim 11, wherein the apparatus is further caused to:

cause, at least in part, an aggregation of one or more outputs of the at least one dynamic processing mechanism and the one or more other outputs of the at least one static processing mechanism; and determining one or more outputs of at least one processing job based, at least in part, on the aggregation.

19. The apparatus of claim 11, wherein the at least one static processing mechanism operates, at least in part, in a batch mode with a predetermined batch frequency; and wherein the at least one dynamic processing mechanism, the at least one processing element, or a combination thereof operate, at least in part, in substantially real-time or at a frequency greater that the predetermined batch frequency.

20. The apparatus of claim 11, wherein the at least one static processing mechanism is associated with performing, at least in part, slow moving data analytics; and wherein the at least one dynamic processing mechanism, the at least one processing element, or a combination thereof are associated with performing, at least in part, fast moving data analytics.

* * * * *

UNITED STATES PATENT AND TRADEMARK OFFICE
CERTIFICATE OF CORRECTION

| | | |
|---|---|---|
| PATENT NO. | : 8,996,693 B2 | Page 1 of 1 |
| APPLICATION NO. | : 13/621511 | |
| DATED | : March 31, 2015 | |
| INVENTOR(S) | : Boldyrev et al. | |

It is certified that error appears in the above-identified patent and that said Letters Patent is hereby corrected as shown below:

In the claims:

Column 26,
Lines 12 and 13, Claim 7, "the processing the processing" should read --the processing--;
Line 16, Claim 8, "The method of claim 1," should read --The method of claim 1, further comprising:--.

Column 28,
Line 1, Claim 17, "wherein process" should read --wherein the process--.

Signed and Sealed this
Eighth Day of December, 2015

Michelle K. Lee
*Director of the United States Patent and Trademark Office*